US005419534A

United States Patent [19]

Vesely

[11] Patent Number: 5,419,534

[45] Date of Patent: May 30, 1995

[54] DEVICE FOR OPENING, IN PARTICULAR, SCISSOR-TYPE JACK MECHANISM

[76] Inventor: Frantisek Vesely, Slavy Hornika 1021, 150 00 Praha 5, Czechoslovakia

[21] Appl. No.: 150,060

[22] PCT Filed: May 21, 1992

[86] PCT No.: PCT/CS92/00014

§ 371 Date: Dec. 1, 1993

§ 102(e) Date: Dec. 1, 1993

[87] PCT Pub. No.: WO92/20610

PCT Pub. Date: Nov. 26, 1992

[30] Foreign Application Priority Data

May 22, 1991 [CS] Czechoslovakia .................... 1533-91

[51] Int. Cl.[6] .................................................. B60P 1/48

[52] U.S. Cl. ...................................... 254/9 C; 254/122; 254/93 HP

[58] Field of Search ...................... 254/122, 8 C, 10 C, 254/9 C, 93 HP, 124

[56] References Cited

U.S. PATENT DOCUMENTS

| | | | |
|---|---|---|---|
| 1,986,273 | 1/1935 | Leffingwell .................... | 254/93 HP |
| 2,070,960 | 2/1937 | Phillips ........................... | 254/93 HP |
| 3,174,722 | 3/1965 | Alm . | |
| 4,149,469 | 4/1979 | Bigler ............................. | 254/93 HP |

FOREIGN PATENT DOCUMENTS

| | | |
|---|---|---|
| 1473991 | 3/1967 | France . |
| 2117765 | 7/1972 | France . |
| 3801491 | 8/1989 | Germany . |
| 2023231 | 12/1979 | United Kingdom . |

*Primary Examiner*—Robert C. Watson
*Attorney, Agent, or Firm*—Notaro & Michalos

[57] ABSTRACT

A device for opening a scissor-type jack with paired cross-bars, the device having a chamber of variable volume connected to fluid inlet and outlet provided by end plates to which two cover plates are fixed. The first cover plate has two flanges disposed on the opposite sides of the cover plate and extending to a second cover plate and are connected for rotation of the first cover plate to the cross-bars. The second cover plate has two flanges. The distance between the two flanges is smaller than the distance between the flanges of the first cover plate and the flanges of the first cover plate are coaxially connected for rotation to the inside surface of the outer cross-bars, while the flanges of the second cover plate are coaxially connected for rotation to the inside surface of the inside cross-bars. In this way the axis of the rotary connection of the two cover plates to the cross-bars, intersects a line joining the centroids of the two end plates.

3 Claims, 3 Drawing Sheets

DEVICE FOR OPENING, IN PARTICULAR, SCISSOR-TYPE JACK MECHANISM

BACKGROUND OF THE INVENTION

This invention relates to a device for opening, in particular, scissor-type jack mechanism of variable length which is usually located in the space between opening bars of the hoisting mechanisms, for example a scissor-type mechanisms of jacks and lifting platforms, and which consists of a variable volume chamber connected to a controlled inlet and outlet of a fluid medium. A change of chamber volume produces a change of length of the opening device whose ends associated with arms of the cross-bars mechanism effectuate opening of the arms and thus the elevation of a platform situated on the top of a cross-bar mechanism.

DESCRIPTION OF THE PRIOR ART

Generally known are expansion members of lever hoisting mechanisms, for example the scissors mechanisms, constituted by a hydraulic cylinder, closed by a fixed bottom at its one end and comprising inside an axially movable piston whose piston rod projects from the other end of the hydraulical cylinder.

The space defined by the fixed bottom of the hydraulic cylinder, its jacket and the axially movable piston constitutes a variable volume chamber which is connected to a controlled inlet and outlet of a pressure medium. At its fixed bottom end the hydraulical cylinder is by means of a pivot or an eye rotatably attached to one arm of the first lever of the hoisting mechanism while the end of the piston rod is similary, by means of a pivot or an eye rotatably attached to the other arm of the second lever of the hoisting mechanism.

Both said arms of the two levers are mutually rotatably connected and the change of the length of the expansion member causes opening and closing motion of the arms. Maximum opening angle of both levers is defined by the length of the lever arms which are attached to the ends of the hydromotor and by the maximum of the distance between the attachment spots at both ends of the hydromotor. Minimum opening angle is similary, besides the lengths of the arms and levers, defined by the minimum distance between the attachment spots of the hydromotot.

Minimum opening angle of the levers affects proportionally the height of the hoisting mechanism in its collapsed position, i.e. the minimum height of a lifting platform above the base. The effort to achieve the lowest possible height of the hoisting mechanism in its collapsed position is appearent mainly by the motor-car jacks, lifting platforms for raising burdens from the base and lifting platforms whose levers consist of several sets of mutually interconnected hoisting mechanisms. With the recent devices this effort has resulted in a "bias" location of the hydromotor what means that the hydromotor is at its one end attached to a longer arm of the first lever while at its other end is attached to a shorter arm of the second level. By this way, with the same length of the hydromotor a smaller angle included by the levers in their collapsed position is attained, however at the price of greater stress to which the hoisting mechanism is exposed when raising a burden of the same weight and the necessity of gemerating by the hydromotor of greater force than it should be necessary with the vertical location of the hydromotor, i.e by attachment of its both ends to the lever arms of the same length.

Even the above said arrangement does not result in attaining minimum opening angles of the levers and moreover it is quite impossible to attain a zero angle included by the levers i.e. to reach such a position where both levers are in alignment.

Furthermore the EP No. 0136986 discloses hoisting mechanisms having at least two pairs of scissors assembly levers where the axially extending expansion member, for example a hydraulical cylinder, is rotatably mounted by its lower end upon the base of the hoisting mechanism approximately in the axis of rotation of the first pair of the scissors-type levers while to its upper end a cross joint projecting transversely through oblong holes in the upper arms of the second pair of the scissors assembly levers. The cross pivot is at its both ends provided by rollers engaging surface of cams attached to the lower arms of the first pair of the scissor levers. The levers of this scissors assembly may be collapsed into "allignment" so that the angle included thereby is equal to zero. In the first phase of opening of the levers the expansion member urges the rollers towards the cam surfaces of the lower arms of the first pair of the scissors levers and simultaneously urges the cross joint projecting the oblong hole of the upper arms of the second pair of the scissor levers towards those levers. In the second phase of opening process, when the cross joint engages the end of the above said oblong hole, the expansion member actuates only the upper arms of the second levers of the scissors assembly. An disadvantage of this hoisting mechanism lies in a great stress of the scissors levers caused by the "bias" location of the expansion member and more complicated technology of manufacture. The same or similar disadvatages show analogous hoisting mechanisms disclosed for example in WO 88/00170 and EP 0275495.

In U.S. Pat. No. 4,822,004 there is disclosed a hoisting mechanism where the expansion member is represented by a air cylindrical unit provided by a piston, whose rod is by means of a cross joint rotatably attached to upper arms of a first pair of scissors levers and whose cylinder is near the end of the opposite bottom rotatably attached by means of coaxial pivots to lower arms of the second pair of scissors levers. An disadvantage of this device is that the scissors levers cannot be collapsed in allignment and that the cylindrical unit considerably overlaps the outlines of the levers in collapsed position.

DE-OS 2 605142 discloses an expansion member of a lever mechanism of a lifting platform consisting of an elastical, for example air actuated chamber, arranged in the first housing consisting of a bottom provided by vertically projecting sidewalls which engage sliding guides of sidewalls of the second housing of a shape formed like a negative of the first housing. The second housing serves as a base for the lifting device and for the rotatable attachment of lower ends of the levers of the lifting platform. By raising the platform rollers fixed to the first housing urge towards the said levers the upper ends of which are associated with the lifting platform. An disadvatage of this lifting devices lies on the one hand in a low value of its relative extention which is limited by the necessity of providing guide between the two housings and equals to 1.9 to the maximum and on the other hand in the fact that the housing in its collapsed position overlaps considerably the outlines of the collapsed levers, what causes unfavorable increase of the height of the collapsed hoisting mechanism.

DE-OS 38 01 491 discloses a scissor-type jack mechanism with paired cross-bars operated by means of a air bellows. The bellows is at one end by means of a rocker rotatable connected to the outside surface of the outside cross-bars while the other end of the air bellows is rotatably mounted by means of a transversal beam upon the projections provided at the inside cross-bars.

A disadvantage of such a jack mechanism is that the distance between the connection means at the two ends of the air bellows in compressed position is too great to enable the cross-bars to collaps in alignment with each other or in a position close thereto. Thus the overall height of the collapsed mechanism is increased. Another disadvantage consists in the fact that the connection of the rocker to the outside surfaces of the outside cross-bars restricts the angle of the opening of the scissor-type arms and thus also the maximum operating height of the jack mechanism.

SUMMARY OF THE INVENTION

The above stated disadvantages are eliminated by application of a opening device according to the invention in particular for the scissor-type jack mechanisms with paired cross-bars the device having a chamber of variable volume constituted by an elastic bellows and connected to fluid inlet and outlet means, provided by end plates to which two cover plates are fixed, the first cover plate being provided by two flanges disposed on the opposite sides of the cover plate and extending to a second cover plate and connecting rotatably the first cover plate to the cross-bars.

According to the invention the second cover plate is provided with two flanges disposed on the opposite sides of the second cover plate and extending to the opposite first cover plate, the distance between the two flanges being smaller than the distance between the flanges of the first cover plate and the flanges of the first cover plate arranged at a greater distance to each other are coaxially rotatably connected to the inside surface of the outer cross-bars while the flanges of the second cover plate arranged in a smaller distance to each other are coaxially rotatably connected to the inside surface of the inside cross-bars whereby the axes of means for rotatable connection of the two cover plates to the cross-bars cut the line joining the centroids of the two end plates and at least at the area of the means for the rotatable connection the outside cross-bars and the inside cross-bars a spaced apart.

Moreover it is advantageous if the distance between the end cover of the chamber of variable volume and the axis of the means connecting the cover plates to the cross-bars is equal to the half of the height of the chamber of the variable volume in compressed position.

DESCRIPTION OF THE DRAWINGS

The accompanied drawings shall serve for more detailed explanation of the invention wherein.

DESCRIPTION OF THE PREFERRED EMBODIMENT

Figure 1:
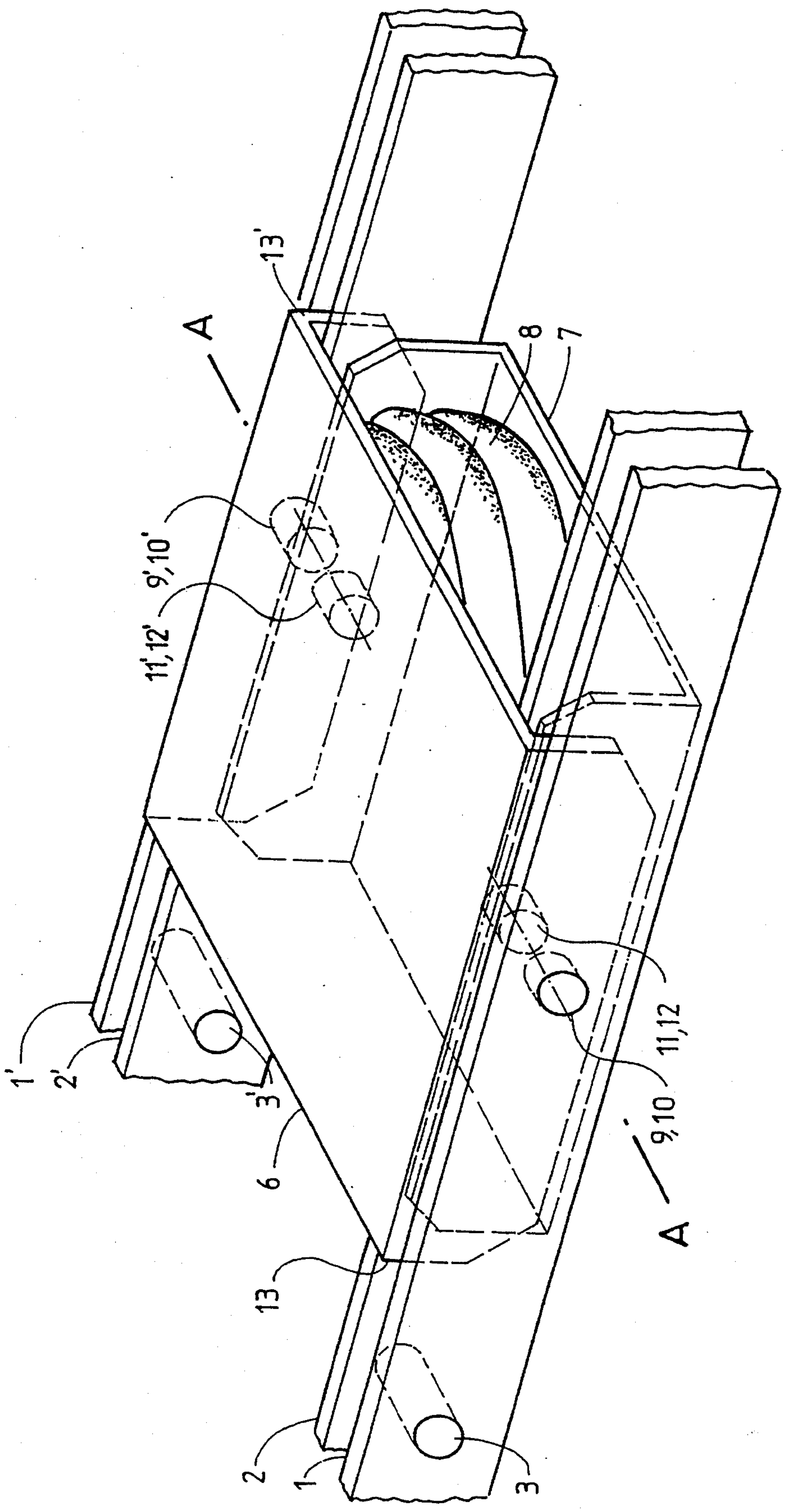
FIG. 1 is a perspective view at an opening device with the cross-bars of the jack mechanism in alignment.
Figure 2:
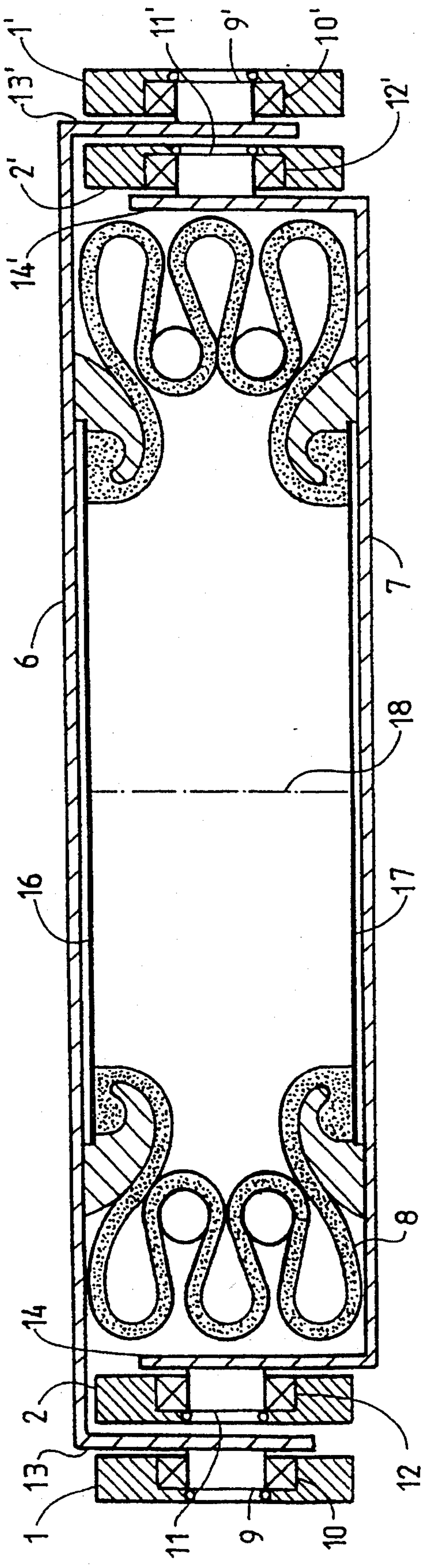
FIG. 2 shows the opening device and the cross-bars of the jack mechanims in section.
Figure 3:
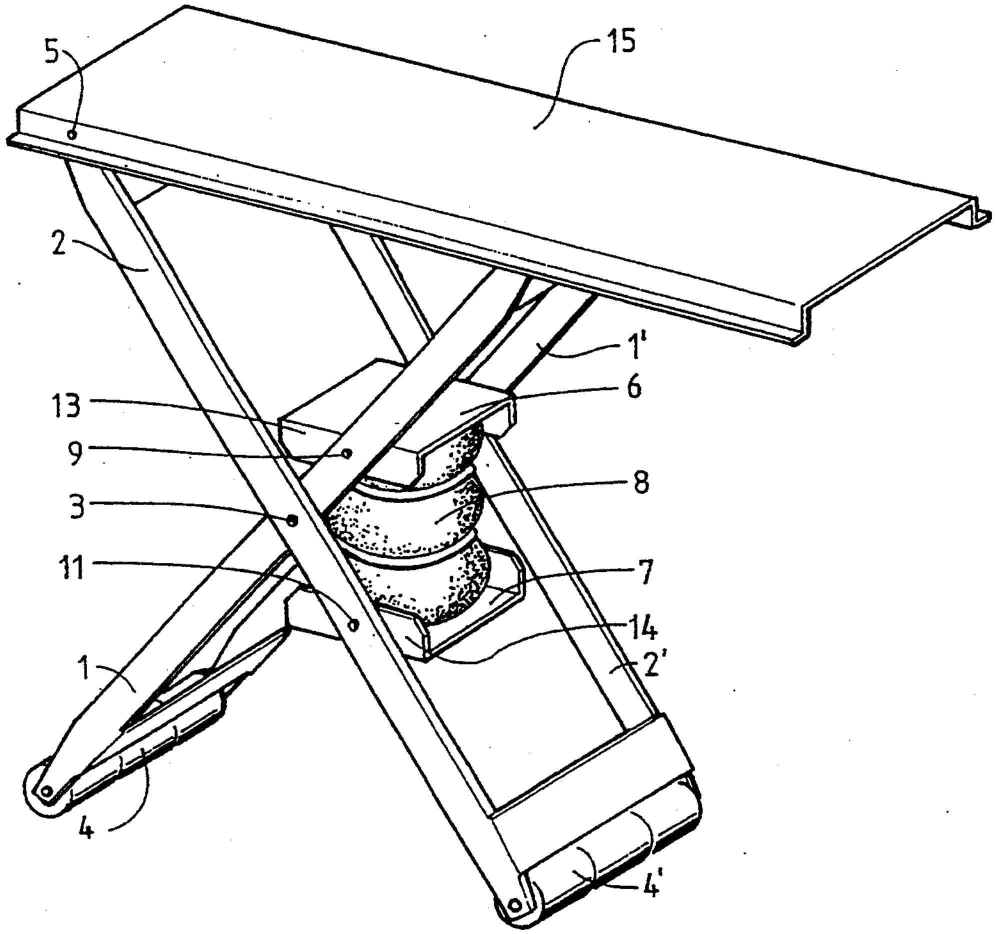
FIG. 3 is a perspective view at the opened cross-bars of the jack mechanism.

As shown in the attached drawings the cross-bar jack mechanism consists of paired cross-bars 1,2, and 1′ 2′. Each pair of the cross-bars 1,2 and 1′,2′ is in the middle of their lengths rotatably coupled together by means of bearings and pivots 3,3′ whereby the pivots 3,3′ are provided by spacing rings to ensure the lateral clearence between the paired cross-bars 1,2 and 1′, 2′. The lower arms of the cross-bars 1,2 and 1′,2′ are provided by rollers 4,4′ for movement along the surface of a base. The upper arms of the cross-bars 2,2′ are connected by means of pivots 5 to the first end part of the lifting platform 15 which is near its second end part supported for example by rollers arranged at the upper arms of the cross-bars 1,1′. An opening element of the cross-bar mechanism consists of an elastic bellow or chamber 8 constituted by a cylindrical bellows and provided by end covers 16,17 which are movable with respect to each other. The opening element is attached to the upper arms of the cross-bars 1,1′ and to the lower arms of the cross-bars 2,2′ always at the same distances from the pivots 3,4′. A cover plate 6,7 is fixed to each end cover 16,17. The upper cover plate 6, has two opposite flanges 13,13′ which extend towards the opposite cover plate 7 and enclose from the outside the inside cross-bars 2,2′ if the jack mechanism is in the collapsed position as shown in FIG. 1 and FIG. 2. The flanges 13,13′ are by means of connecting means—the pivots 9,9′ mounted in bearings 10,10′ fixed at the inside surfaces of the two upper arms of the cross-bars 1,1. The lower cover plate 7 is also provided by two opposite flanges 14,14′ which are by means of coaxial pivots 11, 11′, mounted in the bearings 12,12′, fixed at the inside surfaces of the lower arms of the inside cross-bars 2,2′. As can be seen in FIG. 2 the distance between the flanges 14,14 of the lower cover plate 7 is smaller than the distance between the flanges 13,13′ of the upper cover plate 6 and the inside cross-bars 2,2′ are arranged between the flanges, 13,14 and 13′,14′.

In order to ensure the parallel movement of the two cover plates 6,7 by the expansion of the elastic chamber 8, to avoid its deviation and to ensure minimum or null distance of the axes of the means for rotatable connection 9,10, 11,12, when the elating chamber 8 is in the compressed position (see FIGS. 1 and 2) the axis of the coaxial means for rotatable connection 9,10 and 9′,10′ of the cover plate 7 has to cut the line 18 joining the centroid of the end plate 16 and the centroid of the end plate 17. A greater distance between the flanges 13 and 13′ of the cover plate 6 than the distance between the flanges 14,14′ of the end cover plate 7 provides that in the compressed position of the elastic chamber 8 the axes of the coaxial means for rotatable connection 9,9′ and 11,11′ of the cross-bars mechanisms are identical and thus the cross-bars 1,2 and 1′,2′ connected by the connection means make no angle and the lifting platform takes a position of a minimal height above the base. The mutual position of the cross-bars 1,1′ and the cross-bars 2,2′ is such that at least at the area of the connecting means for rotatable motion 9,9′,11,11′ the outside cross-bars 1,1′ and the inside cross bars 2,2′ are spaced apart, to constitute a lateral clearence therebetween.

The opening device according to the invention enables to achieve the minimum of the possible height of the cross-bar jack mechanism in its collapsed position and due to its relative great extension also a satisfactory elevation stroke while the cross-bar mechanism is exposed to a minimal stress.

The opening device according to the invention is suitable for use in the cross-bar jack mechanisms and jack mechanisms of the lifting platforms applicable mostly i the car repair shops, storage operations, civil engineering etc.

I claim:

1. A scissor-type jack mechanism, in particular for a lifting platform, comprising;

two sets of cross-bars, spaced apart from each other and together forming a first pair of opposite inside bars with upper and lower opposite arms, and a second pair of opposite outside bars with upper and lower opposite arms, the upper arm of each bar engaging the lifting platform and the lower arm of each bar being constructed for abutting a support surface;

a pivot connected to each set of cross-bars for pivotally connecting each set of cross-bars to each other at a location between respective upper and lower arms thereof;

an elastic bellow disposed between the two sets of cross-bars and having opposite end plates;

a pair of cover plates, each engaged over one of the end plates, each cover plate having two opposite flanges adjacent respective arms of the two sets of cross-bars;

two first connecting means mounted coaxially to and diametrically from each other, each of the first connecting means being spaced from the pivot and being connected to one opposite arm of the pair of inside bars for rotatably connecting the inside bars to the outside opposite flanges of one of the cover plates;

two second connecting means mounted coaxially to and diametrically from each other, each second connecting means being spaced from the pivot and being connected to one opposite arm of the pair of outside bars, on inside surfaces of the outside bars, for rotatably connecting the outside bars to the outside opposite flanges of the other cover plate;

each end plate having a centroid, a common axis of the two first connecting means and a common axis of the two second connecting means intersecting a line extending between the centroids of the end plates;

a space between the bars of each set of cross-bars being sufficiently large to receive the flanges which are connected to the outside bars so that the flanges that are connected to the outside bars pass between the bars of each set of cross-bars when the elastic bellow is in a collapsed position with the cover plates near each other.

2. A scissors-type jack mechanism according to claim 1, wherein a distance between the cover plates and the common axis of the connecting means is equal to a height of the elastic bellow in its collapsed position.

3. A scissors-type jack mechanism according to claim 1, wherein the flanges connected to the inside bars are connected to inside surfaces of the inside bars, the distance between the flanges connected to the inside bars being less than the distance between the flanges connected to the outside bars so that with the cover plates near each other, the flanges of the two cover plates overlap each other.

* * * * *